Dec. 15, 1942. W. C. ALVIN 2,305,400
WELDING JIG
Filed Jan. 16, 1941
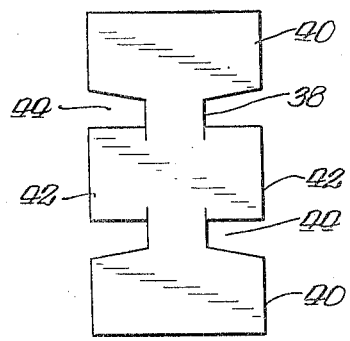
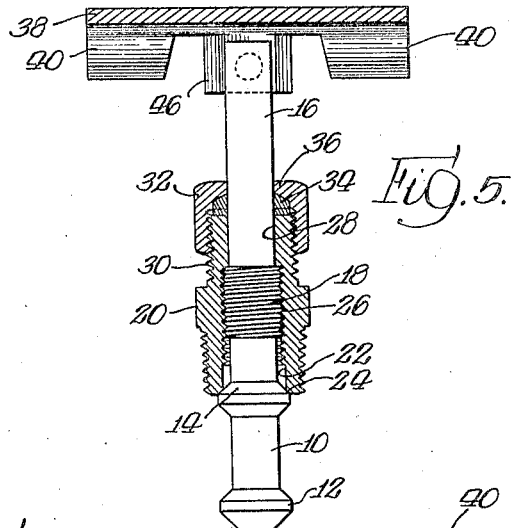
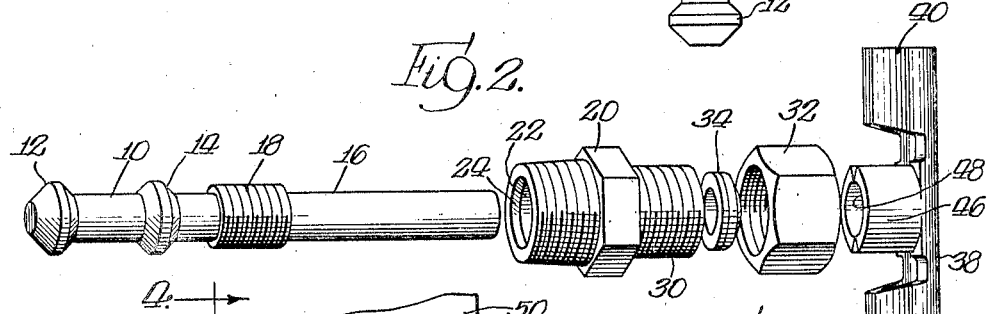
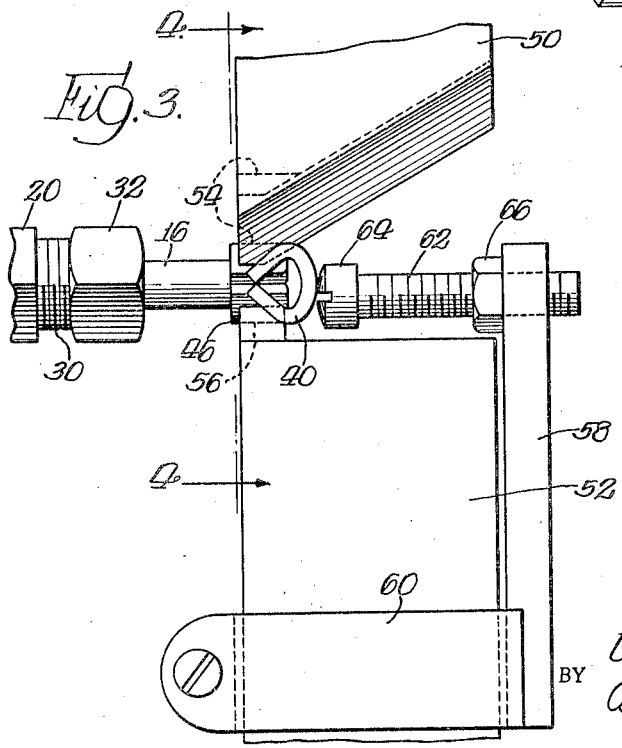
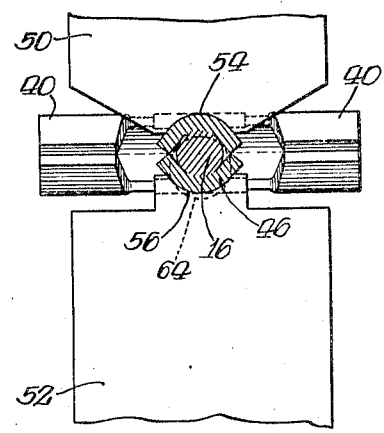
INVENTOR.
Walter C. Alvin,
BY Bair & Freeman attys.

Patented Dec. 15, 1942

2,305,400

UNITED STATES PATENT OFFICE 2,305,400

WELDING JIG

Walter C. Alvin, Chicago, Ill., assignor to The Imperial Brass Manufacturing Co., Chicago, Ill., a corporation of Illinois Application January 16, 1941, Serial No. 374,687

1 Claim. (Cl. 219—17)

My invention relates to a welding jig for valve devices and particularly small valves such as drain valves for radiators wherein all of the parts are permanently assembled together at the factory.

Among the objects of my invention is to provide a welding jig for a simple and inexpensive valve assembly which is easy to manufacture by use of regular and standard equipment.

Another object of my invention is to provide a new and improved jig for attaching a valve handle to a valve stem whereby the handle is made an integral part of the valve stem.

Still another object of my invention is to provide a welding jig utilizing in part the welding electrodes and an adjusting device which effectively clamps the valve stem and handle in proper position during an operation directed to the welding of a part of the handle to the valve stem.

A still further object of my invention is to provide a welding jig to facilitate a simple and easy method of permanently attaching a valve handle to a valve stem whereby the handle is made such an integral part of the stem that no wear or slipping will take place.

With these and other objects in view, my invention consists in the construction, arrangement and combination of the various parts of my device to facilitate the exercise of the successive operations of my method whereby the objects contemplated are attained as hereinafter more fully set forth, pointed out in my claim and illustrated in the accompanying drawing, in which:

Figure 1 shows the material of the handle cut out of a blank sheet prior to being formed into a handle.

Figure 2 is an exploded perspective view showing the parts of the device prior to assembly.

Figure 3 is an elevational view showing the electrodes in operating position upon the handle.

Figure 4 is an elevational view partly in section taken on the line 4—4 of Figure 3.

Figure 5 is a longitudinal sectional view of the device when completely assembled.

Heretofore, valve assemblies of this general description have been made of separate parts mechanically joined together so that the valve handle may be secured non-rotatively to the valve stem. For this purpose various sorts of jigs have likewise been designed in order that the assembled parts of the valve device might be held in such a position that their alignment could not be disturbed while the final operation of fastening the handle to the stem was performed. In view of the fact that all of the parts of the valve are assembled first, care must be taken in handling the device so that no damage is done to the various parts and particularly to the valve and valve seat. In the practice of my invention herein described, a method is devised for fastening the valve stem to the handle in such a way that no pressure of any kind is exerted upon any parts of the assembly except the very end of the valve stem which is joined to the handle.

The practice of my method includes the preparation of a jig-like device in order to hold the stem of a valve assembly while the operation is being performed upon it. One application of my method is illustrated in the drawing and is directed to the fastening of a handle to a valve stem after all the other parts of the valve have been assembled together. The particular valve shown consists of a valve stem 10 on which is a valve 12 designed to seat against parts of a valve apparatus separated from the particular assembly here illustrated and a second valve 14. Likewise forming part of the valve stem is a shank 16 on which is a threaded portion 18. A valve body 20 is shown provided with an aperture 22 of such diameter that it can slip easily over the entire shank. At one end of the aperture is a valve seat 24 against which the valve member 14 is designed to seat. Within the aperture 22 is likewise a threaded portion 26 which is designed to threadably engage the threaded portion 18 of the shank. At its upper end 28 the aperture 22 is made somewhat smaller in diameter so that it forms a rather snug but freely rotating fit about the shank 16.

At the upper end, as viewed in Figure 5, the body is threaded as illustrated at 30 so that it can engage a threaded packing nut 32. A compressible packing ring 34 fits between the top side of the body 20 and a shoulder 36 within the packing nut, so that when assembled a liquid-tight joint is formed.

A handle 38 shown as a blank in Figure 1 is stamped from a piece of sheet metal usually by a punch press and is turned to the form shown in Figure 5. It will be observed that the outer ends 40 of the handle are turned into a somewhat rounded hollow shape to provide strength and likewise to provide a fingerhold. A central portion 42 separated from the ends by cut out spaces 44 is formed, as shown best in Figure 2, into a hollow split cup 46, with its longitudinal axis at right angles to the axis of the rounded ends 40. The inside diameter 48 of the hollow cup is formed slightly larger than the diameter of the shank 16 so that the shank can be freely inserted within the hollow cup.

When the handle is fastened to the shank of the valve stem, it is welded in place. The welding operation is accomplished by means of a pair of electrodes 50 and 52 which can be brought into contact with the handle before an electric current is turned on. Electrode 50 has a rounded recess 54 shaped so that it will fit snugly around one side of the split cup and electrode 52 is provided with a similar complementary recess 56 designed to fit around the other side of the split cup. As shown best in Figure 3, the recessed portions of the electrodes have a thickness somewhat less than the length of the split cup 46 so that the heat generated by the current is concentrated or spotted in a small area on each side of the split cup.

For positioning the handle in its nest between the electrodes, there is provided an arm 58 secured to the lower electrode 52 by means of a bracket 60 in such a manner that it can be raised or lowered as occasion requires. At its upper end, as viewed in Figure 3, the arm is provided with a pin 62 threadably engaging the arm. The axis of the pin is in approximate alignment with the axis of the valve stem. A head 64 is shown on the pin for abutting against the handle when it is inserted between the electrodes. There is also provided a locking nut 66 for locking the pin in its adjusted position. It will be apparent that the pin can be threadably rotated either to the right or to the left, as viewed in Figure 3, so that the head 64 may be in a proper position to abut against the handle 46 and position it in its proper place when it is inserted into the space between the electrodes.

In practicing my method, the handle is first formed preferably on a punch press or some similar forming machine by punching it from a piece of sheet metal and then rounding it into the shape shown best in Figures 4 and 5. During the punching process, the split cup 46 is formed and its inside diameter 48 determined so that during assembly, it will have a slip fit over the shank and the valve stem. After the handle has been completely formed, the parts of the valve are assembled. The body is slid over the shank of the valve stem and then threaded down so that the valve seat 24 engages the valve 14. The packing ring 34 is then slid into place and the packing nut 32 threadably engaged with the adjacent end of the body and screwed tightly into place so that the packing ring is forced snugly against the circumference of the shank. The handle is then applied over the end of the valve shank and forced against it until the shank abuts the bottom of the split cup 46.

The operator then, by grasping the opposite ends of the valve stem, inserts the handle into the nest prepared for it between the electrodes and pushes the valve shank against the handle as the handle abuts against the head 64 of the adjusting pin 62. When this has been accomplished, the electrodes are advanced one against the other until the recesses 54 and 56 engage the corresponding sides of the split cup. The current is then turned on and the heat generated welds or fuses the metal comprising the sides of the split cup to the metal comprising the end of the shank 16. After the welding operation, the electrodes are separated, the valve assembly removed and the entire assembly subjected to a plating operation such as, for example, cadmium or some similar metallic plating material.

There has thus been provided a simple method and apparatus for permanently attaching a valve handle to a valve stem, the practice of which is quick and inexpensive.

Some changes may be made in the construction and arrangement of the parts of my device, together with variations in the precise exercise of my method without departing from the real spirit and purpose of my invention, and it is my intention to cover by my claim any modified forms of structure or modifications in the exercise of my method which may be reasonably included within its scope.

I claim as my invention:

A welding jig for welding a valve handle at opposite sides thereof to a valve stem comprising a lower welding electrode having a reduced top portion thereof recessed and rounded for supporting the midportion of the valve handle, an upper welding electrode positioned diametrically above the lower electrode having a reduced midportion recessed and rounded complementary to the rounded portion of said lower electrode for fitting the midportion of said valve handle on the opposite side thereof, and an adjustable stop on one of said electrodes comprising an anchoring bracket having an adjustable connection to said last electrode, an arm on said bracket extending outwardly toward the end of the electrode at the side thereof opposite from the position occupied by the valve handle, an adjusting pin adjustably secured to the free end of said arm with an end of said pin positioned adjacent the midportion of the recesses in said electrodes at a distance from said electrodes respectively not less than the shortest distance between the portions of said upper and lower electrodes nearest each other forming a stop for positioning the valve handle between the electrodes and a locking element coacting with said arm and said pin for anchoring the pin to the arm in adjusted position.

WALTER C. ALVIN.